United States Patent
Yamazaki

(10) Patent No.: US 7,663,330 B2
(45) Date of Patent: Feb. 16, 2010

(54) ELECTRIC POWER STEERING DEVICE, AND CONTROL METHOD THEREOF

(75) Inventor: Ippei Yamazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 177 days.

(21) Appl. No.: 11/917,212

(22) PCT Filed: Feb. 13, 2007

(86) PCT No.: PCT/IB2007/000325

§ 371 (c)(1),
(2), (4) Date: Dec. 12, 2007

(87) PCT Pub. No.: WO2007/093875

PCT Pub. Date: Aug. 23, 2007

(65) Prior Publication Data

US 2008/0199160 A1   Aug. 21, 2008

(30) Foreign Application Priority Data

Feb. 15, 2006   (JP) ............................. 2006-037328

(51) Int. Cl.
*H02P 1/04* (2006.01)

(52) U.S. Cl. ..................... 318/469; 318/432; 318/434; 700/28; 323/234; 323/265; 323/349

(58) Field of Classification Search ................ 318/432, 318/434, 469; 700/28; 323/234, 265, 349
See application file for complete search history.

(56) References Cited

U.S. PATENT DOCUMENTS

| | | | | |
|---|---|---|---|---|
| 6,107,767 A * | 8/2000 | Lu et al. | ..................... | 318/561 |
| 6,112,846 A * | 9/2000 | Mukai et al. | ................. | 180/446 |
| 6,268,708 B1 * | 7/2001 | Kawada et al. | ............... | 318/430 |
| 6,326,758 B1 * | 12/2001 | Discenzo | ..................... | 318/609 |
| 6,397,971 B1 * | 6/2002 | Kifuku | ........................ | 180/443 |
| 6,546,322 B2 * | 4/2003 | Williams | ...................... | 701/41 |
| 6,564,897 B2 * | 5/2003 | Dammeyer | .................. | 180/402 |
| 6,725,965 B2 * | 4/2004 | Kogiso et al. | ............... | 180/446 |
| 7,219,761 B2 * | 5/2007 | Fukuda et al. | ............... | 180/444 |
| 7,241,161 B2 * | 7/2007 | Mar | ........................... | 439/331 |
| 7,294,988 B2 * | 11/2007 | Ajima et al. | ................. | 318/712 |

FOREIGN PATENT DOCUMENTS

DE   101 28 068   1/2003

(Continued)

*Primary Examiner*—Rita Leykin
(74) *Attorney, Agent, or Firm*—Oblon, Spivak, McClelland, Maier & Neustadt, L.L.P.

(57) ABSTRACT

An actual detected current value and a target voltage value of an electric motor are subjected to a low-pass filter process, and amounts of change per time in the filtered actual current value and the filtered target voltage value are calculated. If the amount of change in the actual current value on the increase side is greater than a criterion value and the amount of change in the target voltage value on the decrease side is greater than a criterion value, it is judged that the stroke end has been reached. Then, the upper limit value of the target current value is set at the actual current value obtained in the immediately previous cycle of the feedback control, so as to prevent generation of unnecessary torque.

8 Claims, 7 Drawing Sheets

FOREIGN PATENT DOCUMENTS

| | | |
|---|---|---|
| JP | 8 34359 | 2/1996 |
| JP | 11 78919 | 3/1999 |
| JP | 11 291926 | 10/1999 |
| JP | 2000 177610 | 6/2000 |
| JP | 2003 118611 | 4/2003 |
| JP | 2004 291687 | 10/2004 |
| JP | 2006 131102 | 5/2006 |

* cited by examiner ated by the feedback control means, the stroke end judgment means is able to early detect that the steering position has reached the stroke end. Therefore, the occurrence of excessive torque can be restrained by setting the target current value at a small value at an early timing.

ELECTRIC POWER STEERING DEVICE, AND CONTROL METHOD THEREOF

BACKGROUND OF THE INVENTION

1. Field of the Invention

The invention relates to an electric power steering device that generates steering assist torque in accordance with the steering state of the steering wheel or handle, and a control method thereof.

2. Description of the Related Art

An electric power steering device has an assist controller that has a microcomputer in a main portion. Using the assist controller, the device controls the amount of electricity passed to an electric motor in accordance with the steering state of the steering wheel or handle so as to give a desired steering torque to a steering mechanism. For example, a steering torque sensor that detects the steering torque generated in association with the steering wheel operation of a driver and a vehicle speed sensor that detects the vehicle speed are connected to the assist controller. On the basis of the detection signals from the two sensors, the assist controller computes a target current value of the motor that provides an optimal assist torque, and controls the amount of electricity passed to the motor by feeding back a deviation between the target current value and the value of current that actually flows through the motor (actual current value).

In such an electric power steering device, if the steering wheel is quickly turned leftward or rightward to a stroke end (i.e., a stopper portion that mechanically restricts a terminal end of the steerable range), the rotation of the motor suddenly comes to a stopped state, so that the counterelectromotive force of the motor rapidly disappears. Due to the influence thereof, the current through the motor rapidly increases, resulting in overshooting. To overcome this problem, in an electric power steering device of Japanese Patent Application Publication No. JP-A-11-78919, when the overshooting of current is detected, the control gain of the feedback control is enlarged to reduce the overshooting. In an electric power steering device of Japanese Patent Application Publication No. JP-A-8-34359, when the steering torque is greater than or equal to a predetermined value and the steering rotation speed (steering speed) is less than or equal to a predetermined value, the target current to be passed through the motor is corrected so as to decrease the overload current of the motor.

However, in the device of the Japanese Patent Application Publication No. JP-A-11-78919, since the attainment of the stroke end is determined by detecting that the motor current has actually overshot, the determination is delayed, allowing excessively large torque to occur. The device of Japanese Patent Application Publication No. JP-A-8-34359 judges whether the stroke end has been reached on the basis of the steering rotation speed. However, a situation where the steering rotation speed lessens occurs not only in the case where the stroke end is struck, but also in the case where the steering is held. It is necessary to detect the continuation time of a rotation stopped state in order to determine the presence of a steering-held state. Therefore, the timing of preventing the overcurrent is correspondingly delayed. However, if the determination regarding the stroke end is performed earlier, the likelihood of false detections increases. Such a false detection leads to the reduction of the assist torque during the steering-held state, so that good steering assist cannot be obtained.

SUMMARY OF THE INVENTION

It is an object of the invention to detect the stroke end strike at early timing and restrain the occurrence of excessive torque.

A first aspect of the invention is an electric power steering device including: a motor for providing a steering assist torque; target current determination means for determining a target current value of the motor in accordance with a steering state of a steering wheel; an actual current detection means for detecting a current value actually supplied to the motor; feedback control means for determining a control amount that drives and controls the motor by feeding back a deviation between the target current value determined by the target current determination means and the actual current value detected by the actual current detection means; and motor drive means for driving the motor with the control amount determined by the feedback control means. The electric power steering device further includes: actual current change detection means for detecting a state of change of the actual current value actually supplied to the motor which is detected by the actual current detection means; control amount change detection means for detecting a state of change of the control amount of the motor determined by the feedback control means; and stroke end judgment means for judging that a steering position has reached a stroke end that mechanically restricts a terminal end of a steerable range based on the detected state of change of the actual current value and the detected state of change of the control amount of the motor.

The stroke end judgment means may judge that the steering position has reached the stroke end when the actual current value changes to an increase side and the motor control amount changes to a decrease side.

According to this aspect, the feedback control means determines the control amount that drives and controls the motor (e.g., the voltage value applied to the motor) on the basis of a deviation between the target current determined by the target current determination means and the actual current value detected by the actual current detection means. Then, the motor drive means electrifies and drives the motor with the determined control amount. Then, the stroke end judgment means judges that the steering position has reached the stroke end on the basis of the state of change of the actual current value detected by the actual current change detection means and the state of change of the control amount of the motor detected by the control amount change detection means.

If the steering position reaches the stroke end through a quick steering operation, the rotation of the motor rapidly stops, and therefore the counterelectromotive force rapidly decreases and the actual current flowing through the motor increases. That is, while the motor is rotating, counterelectromotive force occurs, and therefore a great motor control amount (e.g., a target voltage) that overcomes the counterelectromotive force is set. However, when the rotation of the motor suddenly stops, the counterelectromotive force disappears, and therefore the motor control amount becomes excessively great, so that the flow of current becomes easier. Thus, the actual current sharply increases. Therefore, the control amount of the motor determined by the feedback control means decreases. In this case, the more rapidly the motor decelerates, the greater the change of the actual current per time becomes. In this aspect, by grasping the change in the actual current value and the change in the control amount of the motor, it can be judged that the stroke end has been reached, before overcurrent actually flows through the motor. Therefore, it becomes possible to quickly detect the stroke end strike and restrict the amount of electricity passed. In this case, for example, it may be judged that the steering position has reached the stroke end, when the degree of increase of the actual current is greater than or equal to a predetermined value and the degree of decrease of the motor control amount is greater than or equal to a predetermined value.

The electric power steering device may further include upper limit value setting means for restricting the target current value determined by the target current determination means by setting an upper limit of the target current value at a predetermined value when it is judged that the stroke end has been reached. Furthermore, the upper limit value setting means may set the upper limit of the target current value at the actual current value detected immediately before it is judged that the steering position has reached the stroke end.

Therefore, when it is detected that the steering position has reached the stroke end, the upper limit of the target current value is set at the predetermined value, so that the overshoot of the current is restrained and the generation of excessive torque is prevented. Furthermore, by setting the upper limit of the target current value at the value of the actual current detected immediately before it is judged that the steering position has reached the stroke end, a minimum needed assist torque can be maintained without generating excessive assist torque. Therefore, it does not happen that the assist torque becomes excessively small and the steering torque that the driver needs to provide increases.

Generally, in the electric power steering device, the steering torque of the steering wheel is detected on the basis of the twist of the torsion bar. Therefore, when the stroke end is reached through a quick steering wheel operation, the inertia torque of the steering wheel twists the torsion bar so that the detected torque value increases. The increase in the detected torque increases the necessary assist torque. However, further torque generated in the state where the stroke end has been reached only presses a stopper, and is useless. However, in this aspect of the invention, the generation of useless torque can be avoided by setting the upper limit of the target current value at the actual current value detected immediately before it is judged that the steering position has reached the stroke end.

Furthermore, the electric power steering device may further include current restriction release means for releasing an upper limit value restriction of the target current provided by the upper limit value setting means if the target current value determined by the target current determination means becomes lower than a predetermined value when the target current value is restricted by the upper limit value setting means. For example, this predetermined value may be the upper limit value set by the upper limit value setting means. Therefore, the current restriction can be released at proper timing, and unnecessary current restriction can be prevented.

The restriction of the target current value by the upper limit value setting means or the judgment by the stroke end judgment means may be performed while the vehicle is at a stop, and do not need to be performed while the vehicle is running. During the running of the vehicle, the motor may sometimes be rotated by external force exerted on the wheel side from the road surface (so-called reverse input). In such a case, there is a risk of the stroke end judgment means making a false determination. In this aspect, however, by performing the judgment regarding the stroke end and the upper limit value restriction of the target current only while the vehicle is at a stop, the precision can be improved.

The restriction of the target current value by the upper limit value setting means or the judgment by the stroke end judgment means may be performed while the vehicle is at a stop and while the vehicle is running at a speed that is less than a predetermined reference speed, and do not need to be performed while the vehicle is running at the reference speed or higher. While the vehicle is running at very low speed, the probability of the stroke end judgment means making a false determination due to external force exerted on a wheel side from the road surface is low. Besides, if such a false determination should be made, there is no safety hazard. Therefore, this construction of the invention has a merit that the applicable range of the upper limit value restriction of the target current widens.

Moreover, the first aspect of the invention also relates to an electric power steering device comprising:

a motor for providing a steering assist torque;

a target current determination device that determines a target current value of the motor in accordance with a steering state of a steering wheel;

an actual current detection device that detects a current value actually supplied to the motor;

a feedback control device that determines a control amount that drives and controls the motor by feeding back a deviation between the target current value determined by the target current determination device and the actual current value detected by the actual current detection device;

a motor drive device that drives the motor with the control amount determined by the feedback control device;

an actual current change detection device that detects a state of change of the actual current value actually supplied to the motor which is detected by the actual current detection device;

a control amount change detection device that detects a state of change of the control amount of the motor determined by the feedback control device; and a stroke end judgment device that judges that a steering position has reached a stroke end that mechanically restricts a terminal end of a steerable range based on the detected state of change of the actual current value and the detected state of change of the control amount of the motor.

A second aspect of the invention relates to a control method for an electric power steering device including:

a motor for providing a steering assist torque; and motor drive means for driving the motor.

The control method further includes:

determining a target current value of the motor in accordance with a steering state of a steering wheel;

detecting an actual current value actually supplied to the motor;

detecting a state of change of the detected actual current value; detecting a state of change of a control amount that drives and controls the motor by feeding back a deviation between the determined target current value and the detected actual current value; and judging that a steering position has reached a stroke end that mechanically restricts a terminal end of a steerable range based on the detected state of change of the actual current value and the detected state of change of the control amount of the motor.

According to the second aspect of the invention, it can be judged that the steering position has reached the stroke end on the basis of the detected state of change of the actual current value and the detected state of change of the control amount of the motor.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
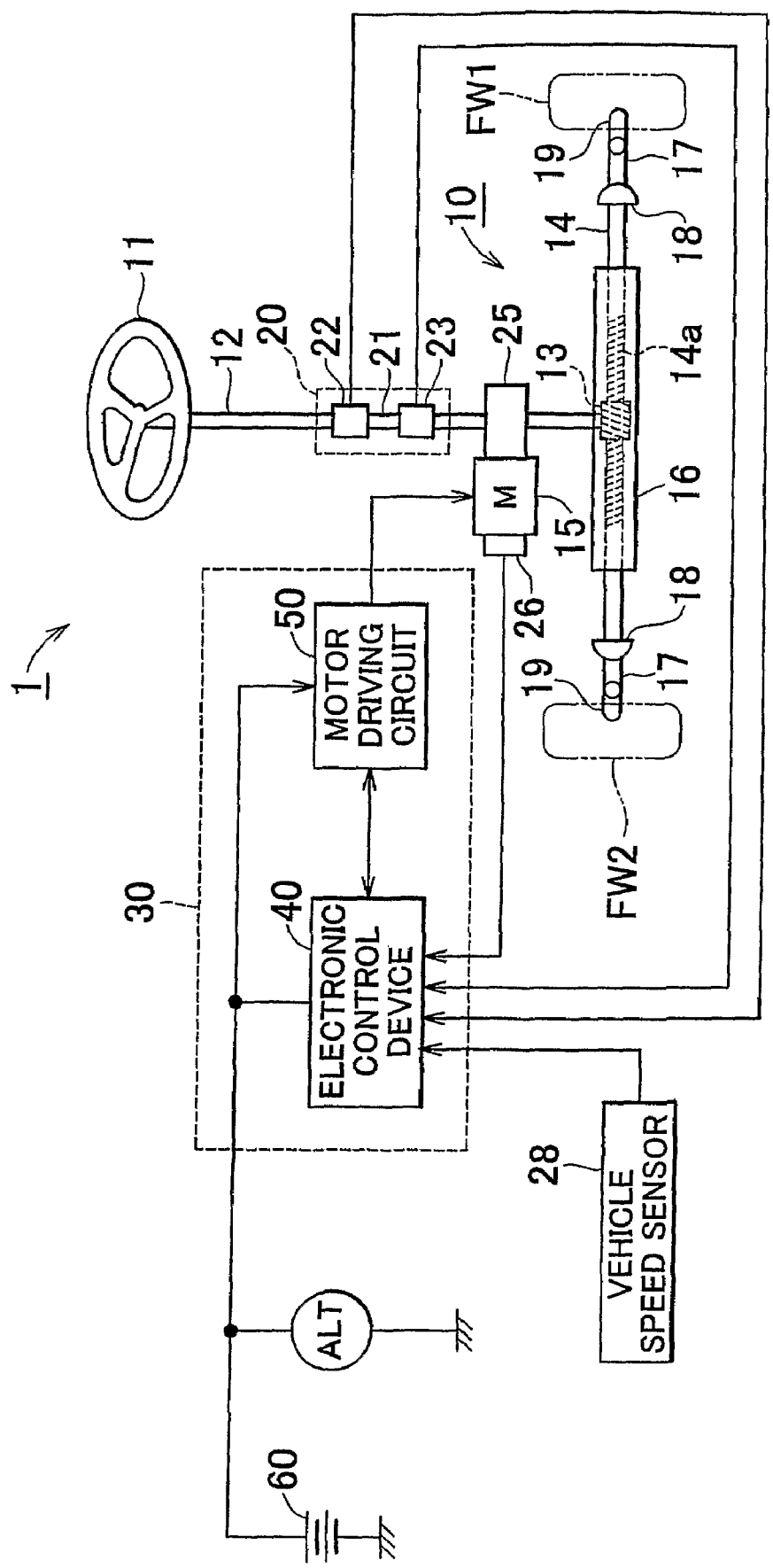
FIG. 1 is an overall construction diagram of an electric power steering device in accordance with an embodiment of the invention.

An electric power steering device in accordance with an embodiment of the invention will be described hereinafter through the use of the drawings. FIG. 1 schematically shows the electric power steering device in accordance with the embodiment.

The electric power steering device 1 is generally constructed of a steering assist mechanism 10 that gives steering assist force to the steering road wheels, and an assist control device 30 that drives and controls an electric motor 15 of the steering assist mechanism 10.

In the steering assist mechanism 10, axial rotation of a steering shaft 12 interlocked with the turning operation of the steering wheel 11 is converted into a motion of a rack bar 14 in a direction of its axis by a rack-and-pinion mechanism 13, and left and right front wheels FW1, FW2 that are the steering road wheels are steered in accordance with the motion of the rack bar 14 in the direction of its axis. As for the rack bar 14, a toothed portion 14a is housed in a rack housing 16, and left and right end portions extend out of the rack housing 16 and are linked to tie rods 17. In a linking portion between the rack bar 14 and each tie rod 17, a stopper 18 that makes up a stroke end is formed. The stoppers 18 mechanically restrict the left and right strokes of the rack bar 14 by contacting the opposite end portions of the rack housing 16. Another end of each of the left and right tie rods 17 is connected to a corresponding one of knuckles 19 provided respectively for the left and right front wheels FW1, FW2.

An electric motor 15 is attached to the steering shaft 12 via a reduction gear 25. The electric motor 15, due to its rotation, rotationally drives the steering shaft 12 about its axis via the reduction gear 25, thus providing assist force for the turning operation of the steering wheel 11. The electric motor 15 is provided with a rotation angle sensor 26. The rotation angle sensor 26 is constructed of a resolver, and detects the rotation angle of the electric motor 15, and outputs a detection signal that represents the detected rotation angle.

A steering torque sensor 20 is attached to the steering shaft 12, at an intermediate portion between the steering wheel 11 and the reduction gear 25. The steering torque sensor 20 is made up of a torsion bar 21 that is inserted in the steering shaft 12 by connecting upper and lower ends thereof to the steering shaft 12, and resolvers 22, 23 that are attached to the upper and lower end portions of the torsion bar 21. The resolvers 22, 23 detect the rotation angles of the upper end and the lower end, respectively, of the torsion bar 21, and output detection signals that represent the detected rotation angles. Therefore, by reading the detected rotation angles from the resolvers 22, 23, the steering torque given to the steering wheel can be detected from the difference between the two detected rotation angles which corresponds to the twist of the torsion bar 21 at the time of steering.

The assist control device 30 is made up of an electronic control device 40 whose main portion is constructed of a microcomputer, and a motor driving circuit 50 that drives and controls the electric motor 15 in accordance with control signals from the electronic control device 40.

On the basis of the steering torque TR detected by the steering torque sensor 20 and the vehicle speed V detected by the vehicle speed sensor 28, the electronic control device 40 determines the amount of electricity passed to the electric motor 15, and controls the motor driving circuit 50 so as to generate a predetermined steering assist force at a timing that is in accordance with the motor rotation angle detected by the rotation angle sensor 26.

Figure 2:
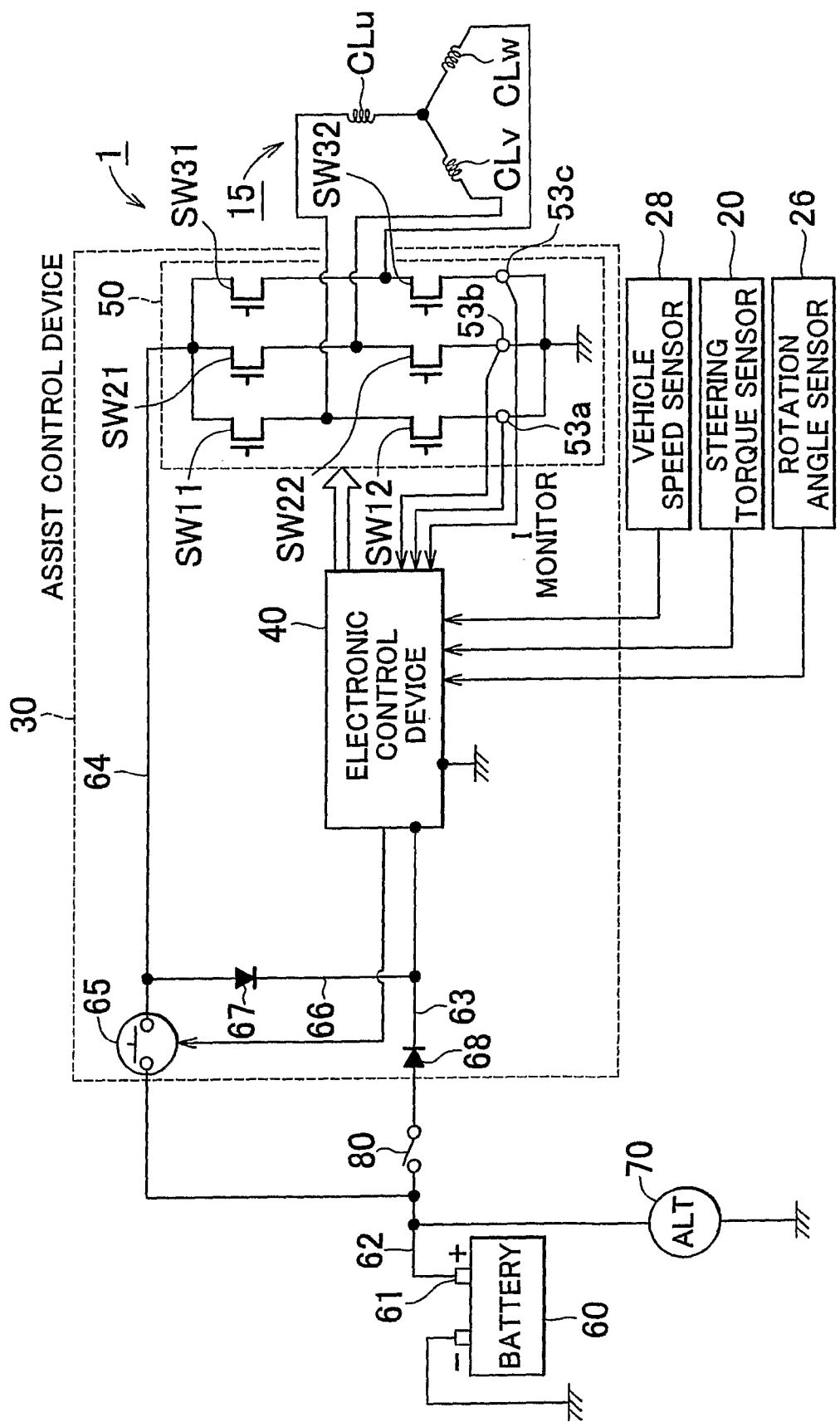
FIG. 2 is a schematic circuit construction diagram mainly showing a motor driving circuit of the electric power steering device.

The motor driving circuit 50, as shown in FIG. 2, forms a 3-phase inverter circuit, and has switching elements SW11, SW12, SW21, SW22, SW31, SW32 corresponding to the coils CLu, CLv, CLw of the electric motor 15. These switching elements SW11, SW12, SW21, SW22, SW31, SW32 in this embodiment are formed by using MOS-FETs, and are on/off-controlled by PWM control signals from the electronic control device 40. Besides, the motor driving circuit 50 is provided with current sensors 53a, 53b, 53c for the respective phases which each detect the value of current through the electric motor 15. Hereinafter, these current sensors 53a, 53b, 53c are collectively called current sensors 53.

Next, the electronic control device 40 that drives and controls the electric motor 15 and the electric motor 15 will be described. As the electric motor 15 in this embodiment, a brushless DC motor constructed of a three-phase synchronous permanent magnet motor is used. This electric motor 15 has a stator that is fixed within the housing. 3-phase rotating magnetic field is formed by causing three-phase current (armature current) to flow through the coils CLu, CLv, CLw wound on the stator. In the 3-phase magnetic field, the rotor to which permanent magnets are fixed is rotated in accordance with the 3-phase current.

Figure 3:
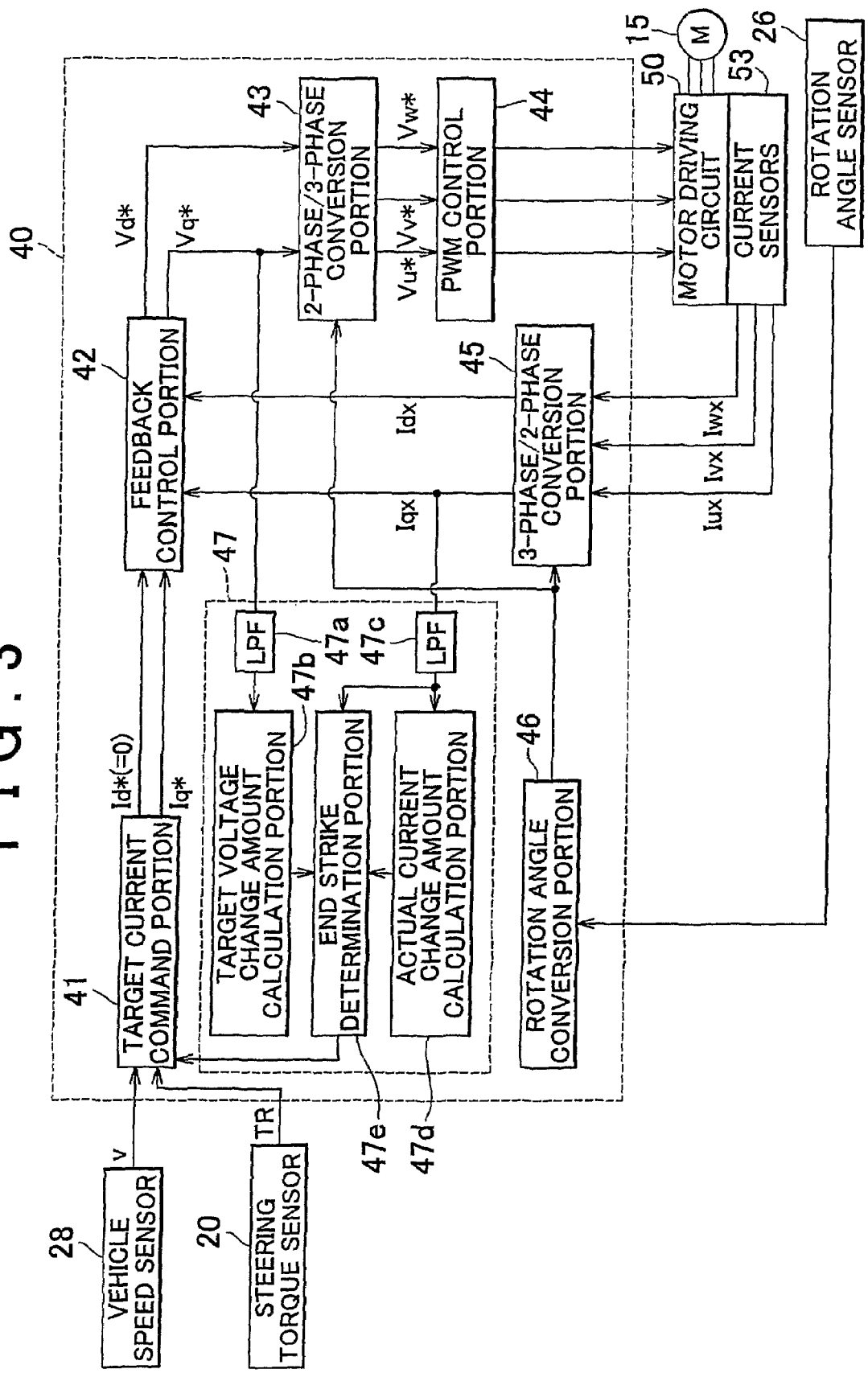
FIG. 3 is a functional block diagram showing a feedback control system of an electronic control device.
Figure 4:
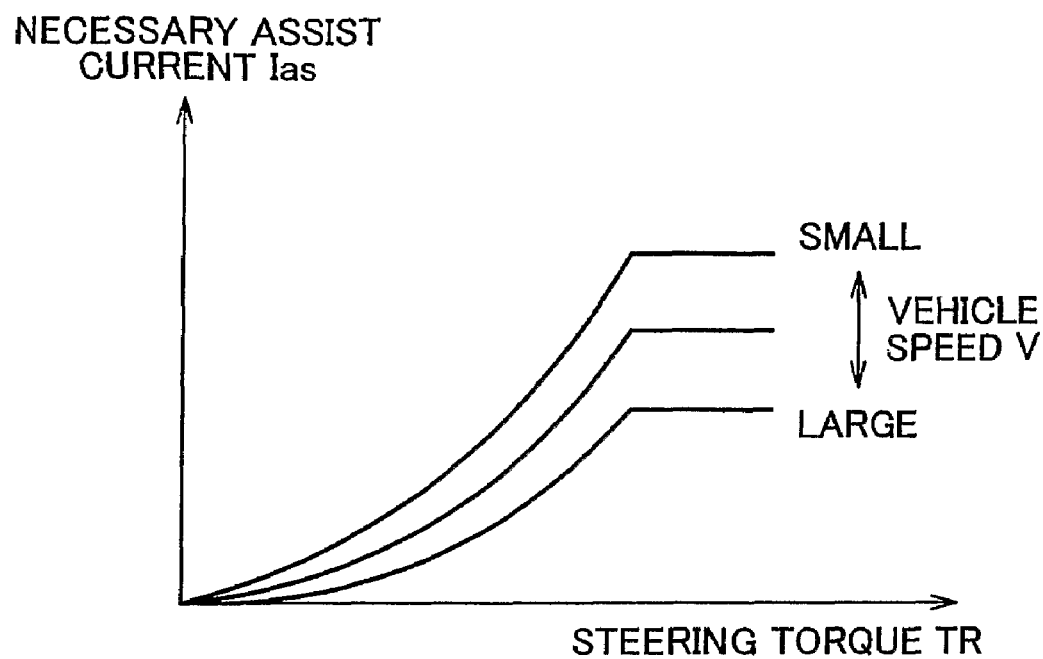
FIG. 4 is an assist current calculation map.

The electronic control device 40 controls the 3-phase current that is caused to flow through the coils CLu, CLv, CLw of the electric motor 15. As shown in FIG. 3, the electronic control device 40 has a target current command portion 41 which inputs the vehicle speed V and the steering torque TR, and which finds a necessary assist current that is needed in order to obtain the assist torque, and which computes a target current value obtained by imposing a predetermined restriction on the necessary assist current in the form of 2-phase command current (Id*, Iq*), and which outputs a command to a feedback control portion 42. The necessary assist current is calculated with reference to a calculation map that is set so that the necessary assist torque increases with the increasing steering torque TR, and decreases with the increasing vehicle speed V as shown in FIG. 4.

Figure 5:
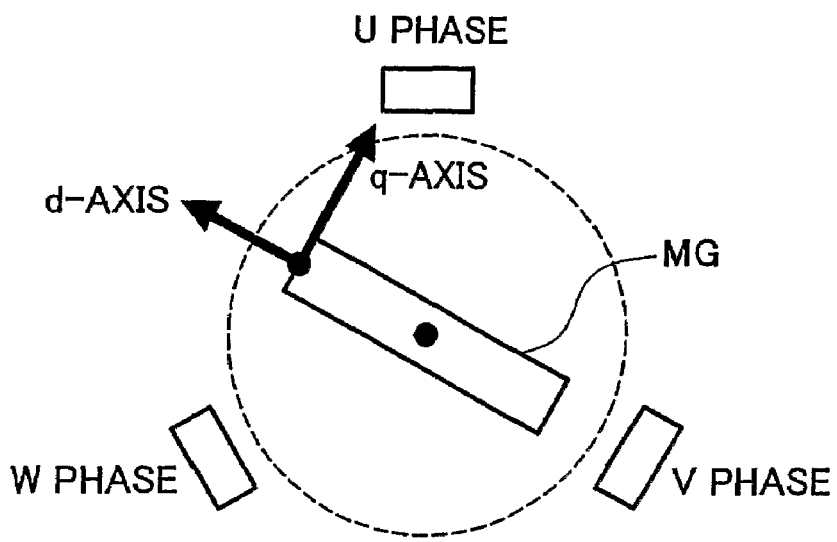
FIG. 5 is a diagram illustrating the directions in which force is generated on the basis of d-p coordinate axes.

The 2-phase command current (Id*, Iq*), as shown in the schematic diagram of FIG. 5, is the armature current in a d-q coordinate system that is formed by a d-axis in the same direction as and a q-axis orthogonal to the magnetic flux created by the permanent magnet MG on the rotor of the electric motor 15. That is, the 2-phase command current (Id*, Iq*) is made up of a d-axis armature current along the d-axis of the d-q coordinate system and a q-axis armature current along the q-axis thereof. The torque of the brushless DC motor constructing a 3-phase synchronous permanent magnet motor is proportional to the multiplication product of the armature winding flux linkage and the q-axis armature current in the d-q coordinate system, and is not affected by the value of d-axis armature current. Therefore, during the assist control, electrification command is output such that only the q-axis armature current that generates rotation torque flows, and the d-axis armature command current Id* is set at "0".

The command signal (target current value) from the target current command portion 41 is output to the feedback control portion 42. The feedback control portion 42 receives inputs of detection values of 2-phase currents Idx, Iqx obtained by converting the 3-phase currents Iux, Ivx, Iwx through the coils CLu, CLv, CLw of the electric motor 15 into 2-phase current. The 3-phase currents Iux, Ivx, Iwx through the electric motor 15 are detected by the current sensors 53, and the 3-phase currents Iux, Ivx, Iwx are converted into the 2-phase currents Idx, Iqx by a 3-phase/2-phase conversion portion 45.

For the 3-phase/2-phase conversion, a rotation angle conversion portion 46 that converts the motor rotation angle detected by the rotation angle sensor 26 into electrical angle is connected to the 3-phase/2-phase conversion portion 45. The feedback control portion 42 calculates different signals Id*-Idx, Iq*-Iqx that represent the deviations between the 2-phase command currents (target currents) Id*, Iq* and 2-phase detected currents (actual currents) Idx, Iqx in order to perform the feedback control of the 3-phase currents Iux, Ivx, Iwx flowing through the coils CLu, CLv, CLw of the electric motor 15. Then, the feedback control portion 42 calculates 2-phase target voltages Vd*, Vq* on the basis of the difference signals Id*-Idx, Iq*-Iqx regarding the 2-phase currents. The target voltages Vd*, Vq* correspond to the control amount for driving the electric motor 15, and are calculated from the values of the difference signals Id*-Idx, Iq*-Iqx regarding the 2-phase currents through a PID control expression or the like. In this case, the d-axis target voltage Vd* that does not generate torque for the electric motor 15 is set at "0". The commands of the target voltages Vd*, Vq* are converted into 3-phase signals by a 2-phase/3-phase conversion portion 43, and the converted signals are output to a PWM control portion 44. For the 2-phase/3-phase conversion, electrical angle signals from the rotation angle conversion portion 46 are input to the 2-phase/3-phase conversion portion 43.

The PWM control portion 44 outputs a pulse width modulation (PWM) control signal to the motor driving circuit 50 on the basis of the 3-phase signals from the 2-phase/3-phase conversion portion 43. In the motor driving circuit 50, the on/off control of the switching elements SW11, SW12, SW21, SW22, SW31, SW32 is performed with a pulse width (duty ratio) that is in accordance with the PWM control signal, and the electric motor 15 is driven with a target voltage that is in accordance with the pulse width.

The target current command portion 41 may be regarded as target current determination means in the invention, and the feedback control portion 42 may be regarded as feedback control means in the invention, and the 2-phase/3-phase conversion portion 43, the PWM control portion 44 and the motor driving circuit 50 may be regarded as motor drive means in the invention, and the current sensors 53 and the 3-phase/2-phase conversion portion 45 may be regarded as actual current detection means in the invention.

The target current command portion 41, the feedback control portion 42, the 2-phase/3-phase conversion portion 43, the PWM control portion 44, the 3-phase/2-phase conversion portion 45 and the rotation angle conversion portion 46 described above form a basic construction that performs feedback control of the electric motor 15. The electronic control device 40 in this embodiment further has a target current restriction command portion 47 that restricts the current through the electric motor 15 at the time of stroke end strike.

The target current restriction command portion 47 is constructed of a low-pass filter portion 47a that inputs the target voltage Vq* signal commanded by the feedback control portion 42 and removes such influence as electrical noise or the like from the input signal, a target voltage change amount calculation portion 47b that calculates the amount of change per time in the target voltage Vq* that has been subjected to a filter process in the low-pass filter portion 47a, a low-pass filter portion 47c that removes such influence as electrical noise or the like from an actual current detection signal Iqx output from the 3-phase/2-phase conversion portion 45 to the feedback control portion 42, an actual current change amount calculation portion 47d that calculates the amount of change per time in the actual current that has been subjected to the filter process in the low-pass filter portion 47c, and an end strike determination portion 47e that determines whether the steering position has reached either one of the stroke ends on the basis of the target voltage change amount calculated by the target voltage change amount calculation portion 47b and the actual current change amount calculated by the actual current change amount calculation portion 47d, and outputs an upper limit current value restriction command for the electric motor 15 to the target current command portion 41 when it is determined that the steering position has reached one of the stroke ends.

The electronic control device 40 constructed as described above is realized in this embodiment by the microcomputer executing a program. The construction shown in FIG. 3 is mere presentation of various functions thereof in a block diagram. The actual current change amount calculation portion 47d in the embodiment may be regarded as actual current change detection means in the invention, and the target voltage change amount calculation portion 47b may be regarded as control amount change detection means in the invention, and the end strike determination portion 47e may be regarded as stroke end judgment means in the invention.

Next, a power supply system of the electric power steering device 1 will be described through the use of FIG. 2. The electronic control device 40 and the electric motor 15 are supplied with power from a battery 60 and an alternator 70. The alternator 7 as a generator is connected to a power supply source line 62 that is connected to a power terminal (plus terminal) 61 of the battery 60. The power supply source line 62 branches into a control power supply line 63 and a drive power supply line 64 which are both connected to the electric power steering device 1.

The control power supply line 63 is a line that supplies power to the electronic control device 40. An intermediate portion of the control power supply line 63 is provided with an ignition switch 80 and a diode 68. The drive power supply line 64 is a line that supplies power to the electric motor 15 via the motor driving circuit 50. An intermediate portion of the drive power supply line 64 is provided with a power source relay 65, and a portion of the line on the load side of the power source relay 65 is provided with a linking line 66 that links to the control power supply line 63. The power source relay 65 is controlled to open or close by the control signal from the electronic control device 40. The linking line 66 is provided with a diode 67 that prevents current from flowing from the control power supply line 63 to the drive power supply line 64.

Figure 6:
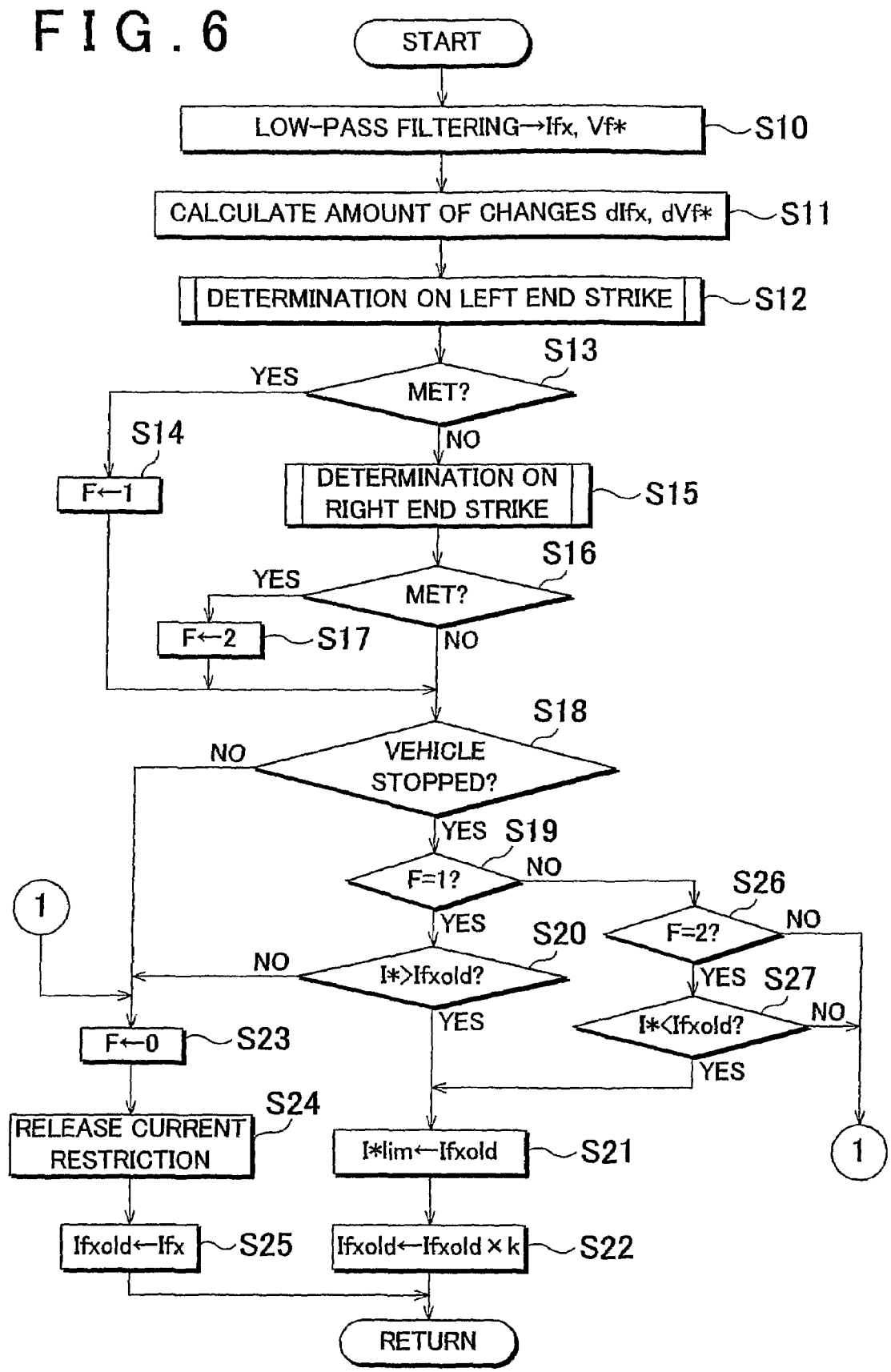
FIG. 6 is a flowchart showing a control routine for current restriction at the time of the stroke end strike.

Next, a current restricting control at the time of stroke end strike which is executed by the target current restriction command portion 47 of the electronic control device 40 will be described. FIG. 6 shows a current restricting control routine executed by the target current restriction command portion 47 of the electronic control device 40. This control routine is stored as a control program in a ROM of the electronic control device 40. This control routine is started upon the on-operation of the ignition switch, and is executed in every predetermined cycle (e.g., every cycle of several hundred microseconds) that is synchronous with that of the current feedback control of the electric motor 15 described above, prior to the current feedback control.

When the control routine is started, the electronic control device 40 reads in the detection signal Ix of the actual current and the command signal V* of the target voltage in the feedback control of the electric motor 15, and performs a low-pass filter process on the signals to find post-filter process actual current value Ifx and target voltage value Vf* (S10). Although in the control routine, the detection signal values and the target values are the values along the q-axis in the d-q coordinate system, the character "q" placed at the end of various signal values shown in FIG. 3 is omitted herein.

As described above, during the steering assist control, a necessary assist current value Ias is found from the steering torque TR and the vehicle speed V with reference to a calculation table shown in FIG. 4. Then, the necessary assist current value Ias is subjected to appropriate correction (e.g., a current correction for preventing overheating or the like, a current restriction at the time of stroke end strike described below) to calculate a target current value I*. Then, a deviation between the target current value I* and the actual current value Ix that actually flows through the electric motor 15 is fed back to a motor drive command voltage value V*. The motor drive command voltage value V* corresponds to the control amount for the drive control of the electric motor 15, and provides a voltage that is applied to the q-axis in the d-q coordinate system.

In the current restricting control routine, in order to detect the stroke end strike on the basis of the states of change of the actual current value Ix and the target voltage value V* used in the steering assist control, a filter process is performed in step S10 to remove such influence as electrical noise from the detection signal Ix of the actual current and the command signal V* of the target voltage. The filter used in this process is a low-pass filter that has a characteristic of passing the electrical and mechanical response frequencies of the electric motor 15 and restricting signals of frequencies higher than the response frequencies. The process of step S10 corresponds the functions of low-pass filters 47*a*, 47*c* shown in FIG. 3.

Subsequently in step S11, the amount of change dIfx per time in the post-filter process actual current value Ifx and the amount of change dVf* per time in the post-filter process target voltage value Vf* are calculated.

For example, the amounts of change are calculated as follows.

$$dIfx = (Ifx - Ifxold)/\Delta t$$

$$dVf^* = (Vf^* - Vf^*old)/\Delta t$$

Ifx: the present filter-processed actual current value

Figure 7:
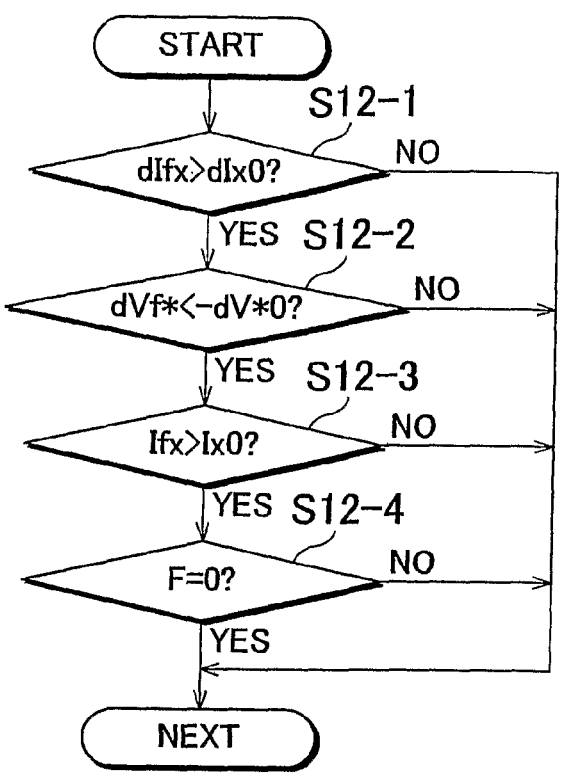
FIG. 7 is a flowchart illustrating a left stroke end strike determination process.

Ifxold: the actual current value filter-processed a predetermined time $\Delta t$ before Vf*: the present filter-processed target voltage value Vf*old: the target voltage value filter-processed a predetermined time $\Delta t$ before Subsequently, the process proceeds to step 812, in which the determination process regarding the left stroke end strike is performed. In this determination process, as shown in FIG. 7, it is determined that the stroke end strike has occurred in the left steering direction if four conditions (S12-1, S12-2, S12-3, S12-4) are met.

| | |
|---|---|
| dIfx>dIx0 | Condition 1: |
| dVf*<−dV*0 | Condition 2: |
| Ifx>Ix0 | Condition 3: |
| flag F=0 | Condition 4: |

Condition 1 (S12-1) is met if the amount of change dIfx in the post-filter process actual current is greater than a criterion-purpose amount of change dIx0. This criterion value dIx0 is set at a positive value.

Condition 2 (S12-2) is met if the amount of change dVf* in the post-filter process target voltage is less than a criterion-purpose amount of change −dV*0. This criterion value dV*0 is set at zero or a positive value. Therefore, if the degree of decrease of the target voltage is greater than a reference value, Condition 2 is met.

Condition 3 (812-3) is met if the post-filter process actual current value Ifx is greater than a criterion value Ix0. In the judgment regarding Condition 3, it is judged whether the direction in which the electric motor 15 is driven (the direction of rotation torque generated) is the left steering direction or the right steering direction, and judgment is not performed regarding overcurrent. Therefore, it is appropriate that the criterion value Ix0 be a small value ($\geq 0$), for example, Ix0=0. In this example, the current value that causes the electric motor 15 to generate rotation torque in the left steering direction is presented as a positive value.

Condition 4 (S12-4) is met if the flag F is set to F=0. The flag F is set to F=1 if the current restriction due to the left stroke end strike is being performed, and is set to F=2 if the current restriction due to the right stroke end strike is being performed, and is set to F=0 if the current restriction is not being performed. Therefore, Condition 4 is met if the current restriction is not being performed.

That is, in the determination process in step S12, it is judged that the left stroke end strike has occurred if: the degree of increase of the actual current is greater than the reference degree of increase (Condition 1); the degree of decrease of the target voltage is greater than the reference degree of decrease (Condition 2); the electrification of the electric motor is controlled so that the motor rotates in the left steering direction (Condition 3); and the stroke end strike was not detected during the immediately previous determination process (the current restriction is not being performed) (Condition 4).

When the electric motor 15 is rotating, there always occurs counterelectromotive force, and therefore the target voltage is set high so as to overcome the counterelectromotive force.

Hence, when the electric motor 15 rapidly decelerates from high rotation speed, the counterelectromotive force rapidly disappears and the flow of current is becomes easier, so that the actual current sharply increases. At this time, due to the current feedback control, the command voltage (target voltage) of the electric motor 15 reduces. Therefore, in this embodiment, this phenomenon is utilized to determine the occurrence of the stroke end strike. Therefore, before the actual current that actually flows through the electric motor 15 becomes excessively large, the occurrence of the stroke end strike can be judged from the degrees of change of the actual current and the target voltage. Although with regard to Condition 3, the magnitude of the actual current is determined, this is not for determining whether the actual current has become excessively large, but for checking the direction of current (steering direction). The criterion value Ix0 for this condition is set at a current value that is smaller than an excessively large current. Due to these condition determination processes, the stroke end strike can be detected at earlier timing before the overcurrent flows through the electric motor 15.

After the determination process in step S12 is completed, the process proceeds to step S13, in which it is judged whether or not the conditions in the left stroke end striking determination process are met. If the conditions are met, the flag F is set to F=1 in step S14. On the other hand, if any one of the conditions is not met (NO in S13), the process proceeds to step S15, in which the determination process regarding the right stroke end strike is performed.

Figure 8:
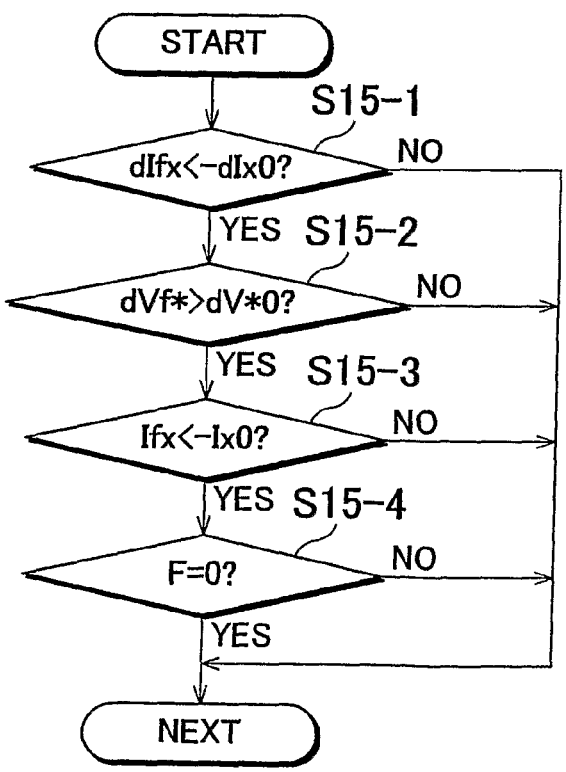
FIG. 8 is a flowchart illustrating a right stroke end strike determination process.

In this determination process, it is determined that the stroke end strike has occurred in the right steering direction if four conditions (S15-1, S15-2, S15-3, S15-4) are met as shown in FIG. 8. In this description, the current value and the voltage value in connection with the driving in the right steering direction are expressed as negative values in order to discriminate the steering directions of the electric motor 15.

$dIfx < -dIx0$  Condition 1:

$dVf^* > dV^*0$  Condition 2:

$Ifx < -Ix0$  Condition 3:

flag F=0  Condition 4:

Condition 1 (S15-1) is met if the amount of change dIfx in the post-filter process actual current is less than a criterion-purpose amount of change −dIx0. If the electric motor 15 is being driven in the right steering direction, the actual current assumes negative values. Therefore, if in such a case, the degree of increase of the absolute value of the actual current is greater than a reference value, the condition is met.

Condition 2 (S15-2) is met if the amount of change dVf* in the post-filter process target voltage is greater than a criterion-purpose amount of change dV*0. If the electric motor 15 is being driven in the right steering direction, the target voltage assumes negative values. Therefore, if in such a case, the degree of decrease of the absolute value of the target voltage is greater than a reference value, Condition 2 is met.

Condition 3 (S15-3) is met if the post-filter process actual current value Ifx is less than a criterion value −Ix0. The judgment regarding Condition 3 is performed for judging whether the direction of the current flowing through the electric motor 15 (the direction in which rotation torque is provided) is the left steering direction or the right steering direction, not for judging the presence of overcurrent. Therefore, it is appropriate that the value Ix0 be a small value, for example, Ix0=0.

Condition 4 (S15-4) is met if the flag F is set to F=0. Therefore, Condition 4 is met if the current restriction is not being performed.

In step S15, the sign (positive or negative) of the target voltage and the actual current is different from that in step S13 due to the difference in the driving direction (direction of torque generation), and therefore the manner of judgment is substantially the same as that in step S13. That is, in the determination process of step S15, it is judged that right stroke end strike has occurred if: the degree of increase of the actual current in the right steering direction is greater than the reference degree of increase (Condition 1); the degree of decrease of the target voltage for the driving in the right steering direction is greater than the reference degree of decrease (Condition 2); the electrification of the electric motor 15 is controlled so that the electric motor 15 rotates in the right steering direction (Condition 3); and the stroke end strike was not detected during the immediately previous determination process (the current restriction is not being performed) (Condition 4). Therefore, the stroke end strike can be detected at early timing.

After the determination process of step S15 is completed, the process proceeds to step S16, in which it is judged whether or not the four conditions in the determination process regarding the right end strike are met. If the conditions are met, the flag F is set to F=2 in step S17. If it is judged that any one of the four conditions is not met in step S16, or after the process of setting the flag F in step S14 or S17, the process proceeds to step S18, in which it is judged whether or not the vehicle is at a stop. For example, this judgment is performed on the basis of the detection signal of the vehicle speed sensor 28. If the vehicle is at a stop, the following current upper limit restriction is performed.

First, the status of the flag F is checked (S19). If the flag F is F=1 (YES in S19), it is then judged whether or not the present target current value I* is greater than the immediately previous post-filter process actual current value Ifxold (S20). If I*>Ifxold, the target current restriction value I*lim is set at the actual current value Ifxold (S21). That is, the actual current value Ifxold immediately previous to the detection of the stroke end strike is set as a target current restriction value I*lim. In this embodiment, the steering torque of the steering wheel 11 is detected from the twist of the torsion bar 21. Therefore, when the stroke end is reached through a quick steering wheel operation, the inertia torque of the steering wheel 11 twists the torsion bar 21 so that the detected torque value increases. The increase in the detected torque increases the necessary assist torque. However, further torque generated in the state where the stroke end has been reached only presses the stopper 18, and is useless. Therefore, in this embodiment, an upper limit value for the target current is set such that useless torque will not be generated. Incidentally, the process of step S21 may be regarded as upper limit value setting means in the invention.

Subsequently, the process proceeds to step S22, in which the actual current value Ifxold is set at a value obtained by multiplying it by a predetermined factor k. If the factor k=1, the target current restriction value I*lim is held at the actual current value Ifxold immediately previous to the detection of the stroke end strike since this control routine is executed in every predetermined cycle. Besides, if the factor k<1, the target current restriction value I*lim is gradually reduced. Conversely, if the factor k>1, the target current restriction value I*lim is gradually increased. As for the factor k, the arbitrary setting in accordance with the needed performance is appropriate. Besides, during the state where the current is restricted by the target current restriction value I*lim, the Ifxold used in the calculation of the amount of change of the actual current, dIfx=(Ifx−Ifxold)/Δt, in step S11 is the value set in step S22. Therefore, the value of Ifxold does not greatly fluctuate, so that the determination regarding the stroke end strike becomes stable.

On the other hand, if the judgment in step S20 is "NO", that is, if the target current I* is less than or equal to the actual current value Ifxold, the flag F is reset to F=0 (S23), thereby releasing the upper limit restriction of the target current (S24). Subsequently, the value of the actual current value Ifxold that has been used up to the present time for the current restriction process is updated to the present actual current value Ifx (S25). Therefore, the value Ifxold used in the calculation of the amount of change of the actual current, dIfx=(Ifx−Ifxold)/Δt, in step S11 in the next cycle is updated to the new actual current value (which is the immediately previous-cycle detected actual current value at the time of the next control cycle).

Immediately after the stroke end strike occurs, the torsion bar 21 is twisted by the inertia force of the steering wheel 11 and the steering torque from the driver, the necessary assist current value Ias increases and, therefore, the target current value I* increases. However, as the inertia force disappears, the target current value I* decreases. Therefore, in the process of steps S20 to S25, the current restriction is released when the present target current value I* has declined to the actual current value Ifxold that has defined the target current upper limit value. In this manner, unnecessary current restriction is avoided. Incidentally, the processes of steps S20 and S24 may be regarded as current restriction release means in the invention.

If the judgment in step S19 is "NO", that is, if the flag F is not F=1, it is then judged whether or not the flag F has been set to F=2 (S26). If the flag F is F=2, the process proceeds to step S27, in which it is judged whether or not the present target current value I* is less than the immediately previous post-filter process actual current value Ifxold (S20). If it is judged that I*<Ifxold, the process proceeds to the above-described process of step S21 and subsequent steps, in which the target current restriction value I*lim is set at the actual current value Ifxold, and then the actual current value Ifxold is set to the value obtained by multiplying the actual current value Ifxold by the predetermined factor k. The judgment in step S27 is performed by comparing the target current value I* (negative value) and the actual current value Ifxold (negative value) occurring when the electric motor 15 is driven in the right steering direction, and is substantially the same as the process of step S20 in terms of absolute value.

On the other hand, if the judgment in step S26 or step S27 is "NO", the process proceeds to the above-described process of step S23, in which the upper limit value restriction of the target current is prevented. Besides, if it is judged in step S18 that the vehicle is running, the process also proceeds to step S23, in which the upper limit value restriction of the target current is prevented.

During the running of the vehicle, the electric motor 15 may sometimes be rotated by external force exerted on the left and right front wheels FW1, FW2 from the road surface. In this case, the amount of change dIfx in the actual current value and the amount of change dVf* in the target voltage value are detected with the same tendency as in the case where the stroke end strike has occurred. Therefore, in order to prevent false determination of the stroke end strike, it is judged in step S18 whether or not the vehicle is at a stop, and the upper limit restriction of the target current value is performed only when the vehicle is at a stop, and the upper limit restriction is released when the vehicle is running. Therefore, the determination accuracy improves, and high reliability is obtained.

In step S12-3 and step S15-3, the driving direction of the electric motor 15 (the positive/negative sign of the current) is included as one of the determination conditions as mentioned above. This is effective in cases as follows. For example, when the tires are stuck to the road surface and cannot easily be steered while parked, it may be necessary to break the ice by the steering wheel operating torque and the assist torque (so-called ice-braking operation). In such cases, if the determination regarding the stroke end strike is performed only on the basis of the changing directions of the actual current value and the control voltage value, it is determined that the stroke end strike has occurred although merely the ice-breaking operation is being performed. Specifically, at the time of "ice-breaking", the motor changes from a state where the motor is stopped from rotating due to the ice (the actual current being large, and the control voltage being small) to a state where the motor rapidly rotates (the actual current being small, the control voltage being large) after the ice is broken. Therefore, the determination condition regarding the stroke end strike is met if the changing directions of the actual current value and the control voltage values are the only bases for the determination. To overcome this drawback, the driving direction of the motor is included in the determination condition.

For example, in the case where the motor is driven so as to generate torque in the left steering direction (current value: plus), it is judged that the "ice-braking" is being performed if the direction of change of the current is the decreasing direction (current: +60A→+20A), and it is judged that the stroke end strike has occurred if the direction of change of the current is the increasing direction (current: +20A→+60A). Besides, in the case where the motor is driven so as to generate torque in the right steering direction (current value: minus), it is judged that the "ice-braking" is being performed if the direction of change of the current is the increasing direction (current: −60A→−20A), and it is judged that the stroke end strike has occurred if the direction of change of the current is the decreasing direction (current: −20A→−60A). Thus, due to the provision of driving direction checking means for checking the driving direction of the motor in addition to the state of change of the actual current value and the state of change of the control amount of the motor, it becomes possible to detect the stroke end strike with even better accuracy.

According to the above-described electric power steering device 1 of the embodiment, by grasping the change in the actual current value supplied to the electric motor 15 and the change in the control amount of the electric motor 15, the stroke end strike can be quickly detected before overcurrent actually flows through the electric motor 15. Then, when the stroke end strike is detected, the upper limit of the target current value is set at the actual current value that is detected immediately previously to the detection of the stroke end strike. Therefore, the overshoot of the current is prevented, and excessive assist torque is not generated, and a minimum needed assist torque can be maintained. Therefore, it does not happen that the assist torque becomes excessively small and the driver's required steering torque increases.

Furthermore, as for the current restriction, the restriction is released when the target current value has declined to the actual current value detected immediately before the detection of the stroke end strike. Therefore, the current restriction can be released at proper timing. Thus, a drawback that the current restriction is continued longer than necessary, or the like, can be prevented. During the running of the vehicle, the upper limit value restriction of the target current is not performed, so that the false determination regarding the stroke end strike due to the influence of external force input from the road surface to the front wheels FW1, FW2 can be prevented.

While the electric power steering device 1 of the embodiment has been described, the invention is not limited to the foregoing embodiment, but can be modified in various manners without departing from the object of the invention.

Figure 9:
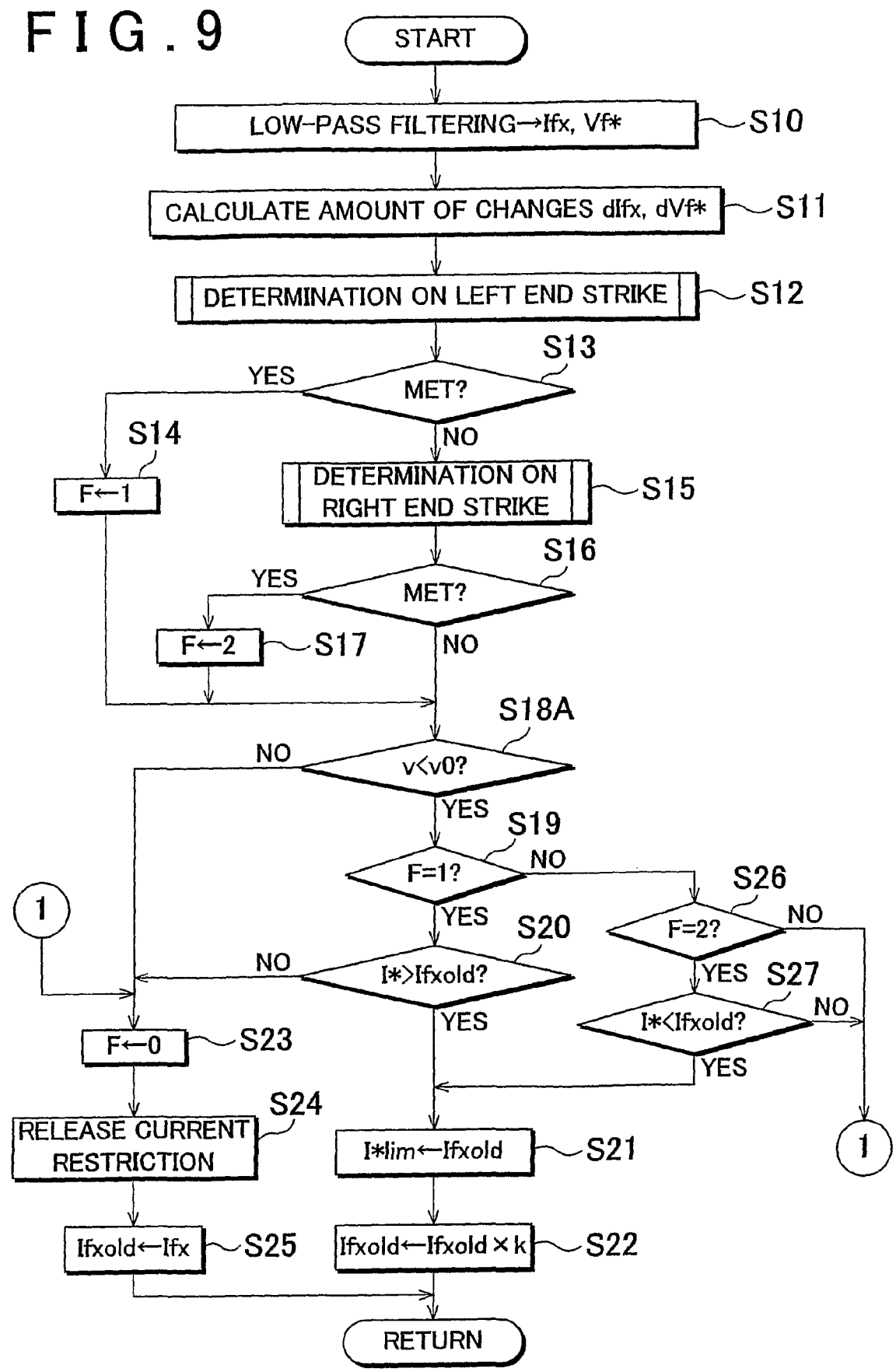
FIG. 9 is a flowchart showing a modification of the control routine for current restriction at the time of the stroke end strike.

For example, in this embodiment, it is judged whether or not the vehicle is at a stop as shown in step S18 in FIG. 6, and the upper limit value restriction of the target current is performed only in the case where it is judged that the vehicle is at a stop. However, it is not altogether necessary to perform the upper limit value restriction only while the vehicle is at a stop. For example, the upper limit value restriction of the target current may also be performed during the very low-speed running of the vehicle as well as during the stop of the vehicle. FIG. 9 shows such a modification in which step S18A is performed instead of the process of step S18 in the above-described current restricting control routine in FIG. 6. In step S18A, it is judged whether or not the vehicle speed V detected by the vehicle speed sensor 28 is less than a reference speed V0. Then, when the condition of V<V0 is satisfied, that is, when the vehicle is running at very low speed or is at a stop, the upper limit value restriction of the target current is performed on the basis of a result of the determination regarding the stroke end strike as described above. While the vehicle is running at very low speed, the probability that external force exerted on a wheel from the road surface causes a false determination that the stroke end strike has occurred is low. Besides, if such a false determination should be made, there is no safety hazard. Therefore, this modification has a merit that the applicable range of the current upper limit value restriction widens.

Furthermore, although in the embodiment, the driving direction of the electric motor 15 is checked in order to improve the accuracy in the determination regarding the stroke end strike, a construction in which the process of checking the driving direction is omitted is also allowable. As for the setting of the target current upper limit value (the setting of the factor k in step S22 in the embodiment), an arbitrary value may be set. For example, it is also allowable to provide target current upper limit value alteration means for setting a target current upper limit value in accordance with the acceleration of the motor immediately previous to the time when the steering position reaches the stroke end. Furthermore, the target current upper limit value may be a predetermined fixed value. Still further, although in the foregoing embodiment, the timing of releasing the upper limit value restriction of the current is set at the time when the target current value declines to the actual current value detected immediately previously to the detection of the stroke end strike, this construction is not restrictive at all. For example, the timing of releasing the upper limit value restriction of the current may be set at the time when the target current value declines to a predetermined value, or may also be set on the basis of the elapsed time following the time of detection of the stroke end strike.

The timing of performing the determination regarding the stop of the vehicle in step S18 may also be earlier than the timing of the stroke end strike determination process (e.g., at the beginning of the control routine shown in FIG. 6). In this case, if the vehicle is running, the control routine may be immediately exited without performing the determination process regarding the stroke end strike. Of course, this is the same with the process of step S18A as a modification that replaces step S18. That is, if the vehicle is running at a speed that is greater than or equal to the reference speed, the control routine may be immediately exited without performing the determination process regarding the stroke end strike.

Furthermore, although in the foregoing embodiment, the electric power steering device of a column shaft type is adopted, it is also allowable to adopt a type of electric power steering device in which a rack bar 14 is driven by an electric motor to provide assist torque. In addition, as for the selection of electric motors, not only the DC brushless motor but various other electric motors may be selected.

The invention claimed is:

1. An electric power steering device comprising:
   a motor for providing a steering assist torque;
   a target current determination device that determines a target current value of the motor in accordance with a steering state of a steering wheel;
   an actual current detection device that detects a current value actually supplied to the motor;
   a feedback control device that determines a control amount that drives and controls the motor by feeding back a deviation between the target current value determined by the target current determination device and the actual current value detected by the actual current detection device;
   a motor drive device that drives the motor with the control amount determined by the feedback control device;
   an actual current change detection device that detects a state of change of the actual current value actually supplied to the motor which is detected by the actual current detection device;
   a control amount change detection device that detects a state of change of the control amount of the motor determined by the feedback control device; and
   a stroke end judgment device that judges that a steering position has reached a stroke end that mechanically restricts a terminal end of a steerable range based on the detected state of change of the actual current value and the detected state of change of the control amount of the motor.

2. The electric power steering device according to claim 1, wherein the stroke end judgment device judges that the steering position has reached the stroke end when the actual current value changes to an increase side and the motor control amount changes to a decrease side.

3. The electric power steering device according to claim 1, further comprising an upper limit value setting device for restricting the target current value determined by the target current determination device by setting an upper limit of the target current value at a predetermined value when it is judged that the stroke end has been reached.

4. The electric power steering device according to claim 3, wherein the upper limit value setting device sets the upper limit of the target current value at the actual current value detected immediately before it is judged that the steering position has reached the stroke end.

5. The electric power steering device according to claim 3, further comprising a current restriction release device for releasing an upper limit value restriction of the target current provided by the upper limit value setting device if the target current value determined by the target current determination device becomes lower than a predetermined value when the target current value is restricted by the upper limit value setting device.

6. The electric power steering device according to claim 3, wherein a restriction of the target current value by the upper limit value setting device or a judgment by the stroke end judgment device is performed only while a vehicle is at a stop.

7. The electric power steering device according to claim 3, wherein a restriction of the target current value by the upper limit value setting device or a judgment by the stroke end judgment device is performed only while a vehicle is at a stop and while the vehicle is running at a speed that is less than a predetermined reference speed.

8. A control method for an electric power steering device including a motor for providing a steering assist torque and a motor drive device for driving the motor, the control method comprising:

- determining a target current value of the motor in accordance with a steering state of a steering wheel;
- detecting an actual current value actually supplied to the motor;
- detecting a state of change of the detected actual current value;
- detecting a state of change of a control amount that drives and controls the motor by feeding back a deviation between the determined target current value and the detected actual current value; and
- judging that a steering position has reached a stroke end that mechanically restricts a terminal end of a steerable range based on the detected state of change of the actual current value and the detected state of change of the control amount of the motor.

* * * * *